(12) United States Patent
Zhu

(10) Patent No.: US 10,799,934 B2
(45) Date of Patent: Oct. 13, 2020

(54) MACHINING PROCESS FOR PRODUCTION OF TITANIUM MOTOR HOUSING

(71) Applicant: Wei Zhu, Wuxi (CN)

(72) Inventor: Wei Zhu, Wuxi (CN)

( * ) Notice: Subject to any disclaimer, the term of this patent is extended or adjusted under 35 U.S.C. 154(b) by 0 days.

(21) Appl. No.: 15/774,615

(22) PCT Filed: Oct. 23, 2017

(86) PCT No.: PCT/CN2017/107294
§ 371 (c)(1),
(2) Date: May 9, 2018

(87) PCT Pub. No.: WO2019/071652
PCT Pub. Date: Apr. 18, 2019

(65) Prior Publication Data
US 2020/0269306 A1     Aug. 27, 2020

(30) Foreign Application Priority Data
Oct. 13, 2017   (CN) .......................... 2017 1 0949668

(51) Int. Cl.
*B21D 22/20*     (2006.01)
*B21D 51/16*     (2006.01)

(52) U.S. Cl.
CPC .................................. *B21D 51/16* (2013.01)

(58) Field of Classification Search
CPC ........ B21D 51/16; B21D 5/015; B21C 37/08; H02K 26/00
See application file for complete search history.

(56) References Cited

U.S. PATENT DOCUMENTS 3,732,614 A    5/1973   Boutell
5,679,989 A *  10/1997  Buscher ................. H02K 26/00
                                                29/596
(Continued)

FOREIGN PATENT DOCUMENTS

CN        1938410 A     3/2007
CN      101745784 A     6/2010
(Continued)

OTHER PUBLICATIONS

Supplementary European Search Report, issued in EP17875064, dated Mar. 25, 2020.
(Continued)

*Primary Examiner* — Jun S Yoo
(74) *Attorney, Agent, or Firm* — Zhu Lupkowski LLP

(57) ABSTRACT

The present invention discloses a machining process for manufacturing a motor housing by using metal titanium, including the following machining steps: Calendar process is adopted, use stamping equipment to stamp the base of the titanium motor housing, apply lubricant on the surface of the die before stamping, and attach a lubricating film on the surface of metal titanium to be stamped; Calendar process is adopted, use stamping equipment to stamp the barrel-shaped titanium motor housing, apply lubricant on the surface of the die before stamping, and attach a lubricating film on the surface of metal titanium to be stamped, and after stamping, a barrel-shaped housing with a barrel depth to port diameter ratio of 1.2~1.8:1 is obtained; Spray and cleanse the housing base obtained from stamping in S1 and the barrel-shaped motor housing obtained from stamping in S2; Assemble the housing base and the barrel-shaped housing obtained in S3 to form the motor housing product; Inspect the assembled motor housing obtained in S4.

7 Claims, 1 Drawing Sheet

(56) References Cited

U.S. PATENT DOCUMENTS

| | | | | |
|---|---|---|---|---|
| 9,192,973 | B1* | 11/2015 | VanDanacker | ........ B21D 22/20 |
| 2018/0281049 | A1* | 10/2018 | Ohtoyo | .................... B21J 5/025 |

FOREIGN PATENT DOCUMENTS

| | | | |
|---|---|---|---|
| CN | 102857007 | A | 1/2013 |
| CN | 103261384 | A | 8/2013 |
| CN | 104242537 | A | 12/2014 |
| CN | 104923603 | A | 9/2015 |
| CN | 106329802 | A | 1/2017 |
| CN | 106374667 | A | 2/2017 |
| CN | 106862473 | A | 6/2017 |
| CN | 106862863 | A | 6/2017 |
| KR | 101028752 | B1 | 4/2011 |

OTHER PUBLICATIONS

The first Examination Report, issued by the State Intellectual Property of China, in Chinese application No. 201710949668.4, dated Dec. 18, 2019.

The second Examination Report, issued by the State Intellectual Property of China, in Chineseapplication No. 201710949668.4, dated Mar. 18, 2020.

The third Examination Report, issued by the State Intellectual Property of China, in Chineseapplication No. 201710949668.4, dated Jul. 16, 2020.

* cited by examiner

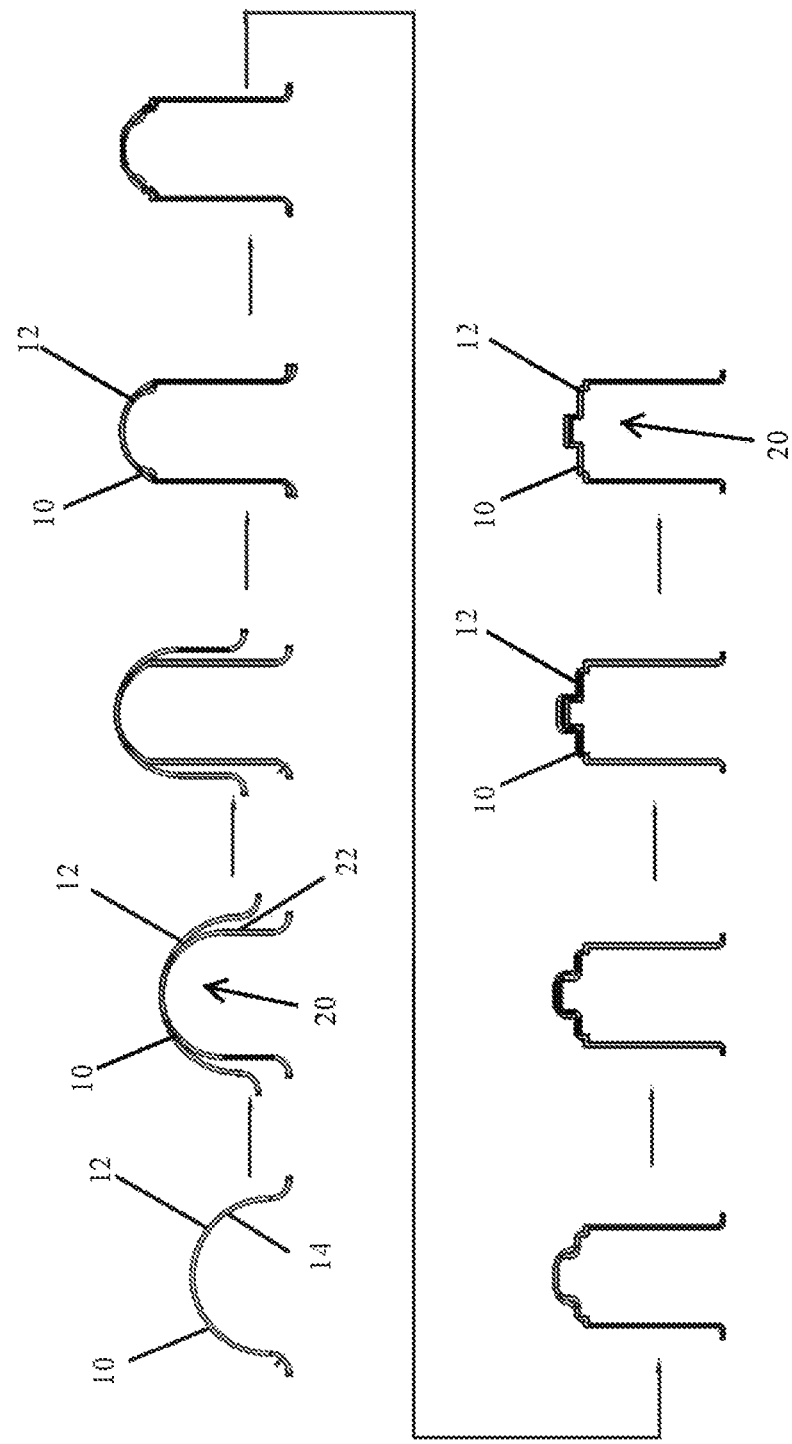

MACHINING PROCESS FOR PRODUCTION OF TITANIUM MOTOR HOUSING

TECHNICAL FIELD

This invention relates to the technical field of motor part production and machining, particularly a process for machining motor housing by using metal titanium.

TECHNICAL BACKGROUND

Characterized by light weight, high strength, having metallic luster, corrosion resistance, high/low temperature resistance, etc., titanium is an ideal stamping material for motor housing. However, due to its difficulty in forming and machining as well as high cost, there is no record of motor housing made of titanium in prior art. In the present stage, people cannot manufacture motor housing by using titanium.

When a titanium alloy has a hardness of more than HB350, its machining and cutting is extremely difficult, and when its hardness is less than BH300, it can very easily stick to the cutters, also making cutting difficult. However, hardness of titanium alloy is only one of the reasons for the cutting and machining difficulties, what is more critical is the impact of the combined chemical, physical and mechanical performances of titanium alloy itself on machinability. Titanium alloy has the following machinability-related characteristics:

(1) Small deformation coefficient: This is a remarkable characteristics of titanium in respect of cutting and machining, and the deformation coefficient is smaller than or close to 1. The slide and friction distance of swarf on the rake face of the cutter increases greatly, which accelerates the cutter wear and reduces the elongation.

(2) High cutting temperature: Since titanium alloys have a very small heat conductivity coefficient (only equivalent to $1/5 \sim 1/7$ of that of #45 steel), and the length of contact between the swarf and the rake face of the cutter is extremely short, heat produced during cutting cannot be easily conducted out and concentrates in the cutting zone and in a small area near the cutter edge, resulting in a very high cutting temperature. Under the same cutting condition, the cutting temperature can be twice that of #45 steel.

(3) Big unit area cutting force: The main cutting force is about 20% smaller than when cutting steel. Since the length of contact between the swarf and the rake face of the cutter is extremely short, the unit contact-area cutting force increases greatly, which can easily cause tipping. Meanwhile, due to a small elasticity modulus of titanium alloys, this can easily give rise to bending deformation under the action of radial force during machining, resulting in vibration, adding to tool wear and affecting the precision of parts and components. Therefore, the process system should have a good rigidity.

(4) Severe chilling phenomenon: Attributable to the high chemical activity of titanium, hard and crispy scales can be easily formed by absorbing O2 and N2 in the air at a high cutting temperature; Meanwhile, the plastic deformation during cutting operation may also cause surface hardening. Not only reducing fatigue strength of the parts and components, the chilling phenomenon can also aggravate tool wear, which is a very important characteristic demonstrated during titanium cutting.

(5) Easy tool wear: After processed by stamping, forging and hot rolling and other methods, hard and crispy uniform scales can be formed, which can easily cause tipping phenomenon, making hard scale cutoff the most difficult procedure in titanium alloy machining. Furthermore, since titanium alloy has a very high chemical affinity towards the materials of the tools, it is very easy to produce accretion wear to the tools under a high cutting temperature and a high unit area cutting force. During turning of titanium alloy, sometimes the wear on the rake face of the cutter is even more severe than flank face of the cutter; At a feed rate f<0.1 mm/r, wear mainly occurs on the flank face of the cutter; At f>0.2 mm/r, wear will occur on the rake face of the cutter; During finish turning and semi-finish turning by using hard alloy cutters, wear on the flank face of the cutter is more appropriate with VBmax<0.4 mm.

When it comes to milling, since titanium alloys have a very small heat conductivity coefficient, and the length of contact between the swarf and the rake face of the cutter is extremely short, heat produced during cutting cannot be easily conducted out and concentrates in the cutting deformation zone and in a small area near the cutter edge, as a result, a extremely high cutting temperature can be formed at the cutting edge during machining, which may greatly shorten the service life of the tools. In respect of titanium alloy Ti6Al4V, under the conditions permitted by the tool strength and machine tool power, the magnitude of cutting temperature is the critical factor affecting the cutter life instead of the cutting force.

Machining of titanium is very difficult. The metal itself is not hard, but it is very "sticky". If a file is used for filing of a tool holder made of titanium-64, cutting ridges of the file may be filled up immediately by the raspings filed off. At present, cutting or mould pressing method is used, and since titanium cannot be cut at a low speed and it may be oxidized due to the excessive heat when cutting at high speed, titanium alloy products cannot be machined at ordinary machining center, while mould pressing can easily give rise to cracks.

SUMMARY OF THE INVENTION

An object of the present invention is to overcome the drawbacks existing in the prior art and provide a titanium motor housing machining process for manufacturing motor housings made of titanium metallic material by stamping method, which is characterized by simple machining process and high forming efficiency, and can be used for mass and high-efficiency production of titanium motor housings.

To achieve the foregoing object, an embodiment of the present invention is to design a machining process for manufacturing motor housings by using titanium, and the said machining process includes the following machining steps:

S1: Calendar process is adopted. Use stamping equipment to stamp the base of the titanium motor housing. Apply lubricant on the surface of the die before stamping, and attach a lubricating film on the surface of metal titanium to be stamped;

S2: Calendar process is adopted. Use stamping equipment to stamp the barrel-shaped titanium motor housing. Apply lubricant on the surface of the die before stamping, and attach a lubricating film on the surface of metal titanium to be stamped. After stamping, a barrel-shaped housing with a barrel depth to port diameter ratio of 1.2~1.8:1 is obtained;

S3: Spray and cleanse the housing base obtained from stamping in S1 and the barrel-shaped motor housing obtained from stamping in S2;

S4: Assemble the housing base and the barrel-shaped housing obtained in S3 to form the motor housing product;

S5: Inspect the assembled motor housing obtained in S4.

To overcome the overheat accretion and pull crack among other defects that can easily occur to titanium during the calendaring process, a preferred embodiment of the present invention is characterized in that lubricant in the said S1 and S2 is cutting oil and calcium hydroxide ($Ca(OH)_2$) mixed into the cutting oil, and the lubricating film is oxalic acid.

To overcome the overhead accretion, pull crack and other defects that can easily occur to titanium during the calendaring process, a further preferred embodiment of the present invention is also characterized in that the lubricant applying method in the said S1 and S2 is using a spray gun or brush to apply the lubricant evenly on the surfaces of contact between the mould and the workpiece to be stamped, the lubricant coating thickness is 20~40 μm, and the method for attaching a lubricating film on the surface of titanium in the said S1 and S2 is that it is attached to the surface of titanium by spraying or brush applying, thickness of the lubricating film on the surface of titanium is 15~30 μm.

To overcome the overhead accretion, pull crack and other defects that can easily occur to titanium during the calendaring process, a further preferred embodiment of the present invention is also characterized in that the calendaring process in the said S1 and S2 includes the following process steps:

1-1: Filming—Attach a lubricating film on the surface of the titanium base material to be stamped;

1-2: Blanking—Cut the titanium base material with a surface lubricating film into the base material to be stamped according to the precalculated dimensions;

1-3: Cleansing—Cleanse the stamped base material obtained from Step 1-2 to remove the grease dirt from the surface, preventing it from contaminating the vacuum annealing furnace;

1-4: Subject the ideally contoured housing base or barrel-shaped motor housing to tempering heat treatment for stress relief;

1-5: Repeat Steps 1-2~1-4, until the contour of the housing base meets the production requirements;

1-6: Punch side holes and base holes in the barrel-shaped motor housing;

1-7: Subject the interior and exterior of the housing base or barrel-shaped motor housing resulted from Step 1-6 to polishing;

1-8: Trim the polished housing base or barrel-shaped motor housing, making its outline dimensions, appearance and form meet the production requirements.

To allow for easy relief of the internal stress during machining of titanium, a further preferred embodiment is also characterized in that the tempering heat treatment in the said Step 1-5 is specifically as follows: First, subject the ideally contoured housing base or barrel-shaped motor housing to vacuum annealing at a temperature of 690° C.; Then hold the temperature for 2 hours; After temperature holding, naturally cool the housing base or barrel-shaped motor housing to the normal temperature in the vacuum furnace.

To allow for assembling the stamped titanium housing base and the barrel-shaped motor housing into motor product, a further preferred embodiment is also characterized in that the housing assembly in the said S3 is specifically done according to the following steps:

3-1: Assemble the qualified housing base obtained in Step 1-7 with the barrel-shaped motor housing, 3-2: Subject the assembly obtained from Step 3-1 to press riveting or welding.

To ensure the product quality meets the use requirements, a further preferred embodiment is also characterized in that the said S4 is intended for final inspection of the housing press riveted or welded according to Step 3-2.

The present invention has the following advantages and favorable effects: the titanium motor housing machining process can be used to manufacture motor housing by using titanium, which can ensure a good product forming quality, improve the products consistency, fill up the blank in titanium motor housing manufacturing, improve the motor performance and extend the motor service life. Stamping process can be used for manufacturing motor housing by using metal titanium, which is characterized by simple machining process, high forming efficiency and allowing for high efficiency mass production.

BRIEF DESCRIPTION OF THE DRAWINGS

FIG. 1 is a schematic drawing showing the titanium motor housing machining process according to the present invention.

DETAILED DESCRIPTION OF THE PREFERRED EMBODIMENTS

The invention will now be described in more detail with reference to the accompanying drawings and embodiments. The following embodiments are merely intended for a better illustration of the present invention, rather than limiting the scope of the present invention.

As shown in FIG. 1, the present invention relates to a machining process for manufacturing a motor housing 10 by using metal titanium, the said machining process includes the following machining steps:

S1: Calendar process is adopted. Use stamping equipment 20 to stamp the base 12 of the titanium motor housing 10. Apply lubricant 22 on the surface of the die before stamping, and attach a lubricating film on the surface of metal titanium to be stamped;

S2: Calendar process is adopted. Use stamping equipment 20 to stamp the barrel-shaped titanium motor housing 10. Apply lubricant 22 on the surface of the die before stamping, and attach a lubricating film on the surface of metal titanium to be stamped. After stamping, a barrel-shaped housing 10 with a barrel depth to port diameter ratio of 1.2~1.8:1 (preferably 1.5:1) is obtained;

S3: Spray and cleanse the housing base 12 obtained from stamping in S1 and the barrel-shaped motor housing 10 obtained from stamping in S2;

S4: Assemble the housing base 12 and the barrel-shaped housing 10 obtained in S3 to form the motor housing product;

S5: Inspect the assembled motor housing 10 obtained in S4.

To overcome the overheat accretion and pull crack among other defects that can easily occur to titanium during the calendaring process, a preferred embodiment of the present invention is characterized in that lubricant 22 in the said S1 and S2 is cutting oil and calcium hydroxide (Ca(OH)2) mixed into the cutting oil.

To overcome the overhead accretion, pull crack and other defects that can easily occur to titanium during the calendaring process, a further preferred embodiment of the present invention is also characterized in that the lubricant applying method in the said S1 and S2 is using a spray gun or brush to apply the lubricant 22 evenly on the surfaces of contact between the mould and the workpiece to be stamped, the lubricant coating thickness is 20~40 μm, and the method for attaching a lubricating film 14 on the surface of titanium in the said S1 and S2 is that it is attached to the surface of titanium by spraying or brush applying, thickness of the lubricating film 14 on the surface of titanium is 15~30 μm.

To overcome the overhead accretion, pull crack and other defects that can easily occur to titanium during the calendaring process, a further preferred embodiment of the present invention is also characterized in that the calendaring process in the said S1 and S2 includes the following process steps:

1-1: Filming—Attach a lubricating film 14 on the surface of the titanium base material 12 to be stamped;

1-2: Blanking—Cut the titanium base material 12 with a surface lubricating film 14 into the base material 12 to be stamped according to the precalculated dimensions;

1-3: Cleansing—Cleanse the stamped base material 12 obtained from Step 1-2 to remove the grease dirt from the surface, preventing it from contaminating the vacuum annealing furnace;

1-4: Subject the ideally contoured housing base 12 or barrel-shaped motor housing 10 to tempering heat treatment for stress relief;

1-5: Repeat Steps 1-2~1-4, until the contour of the housing base 12 meets the production requirements;

1-6: Punch side holes and base holes in the barrel-shaped motor housing 10;

1-7: Subject the interior and exterior of the housing base 12 or barrel-shaped motor housing 10 resulted from Step 1-6 to polishing;

1-8: Trim the polished housing base 12 or barrel-shaped motor housing 10, making its outline dimensions, appearance and form meet the production requirements.

To allow for easy relief of the internal stress during machining of titanium, a further preferred embodiment is also characterized in that the tempering heat treatment in the said Step 1-4 is specifically as follows: First, subject the ideally contoured housing base 12 or barrel-shaped motor housing 10 to vacuum annealing at a temperature of 690° C.; Then hold the temperature for 2 hours; After temperature holding, naturally cool the housing base 12 or barrel-shaped motor housing 10 to the normal temperature in the vacuum furnace.

To allow for assembling the stamped titanium housing base 12 and the barrel-shaped motor housing 10 into motor product, a further preferred embodiment is also characterized in that the housing assembly in the said S3 is specifically done according to the following steps:

3-1: Assemble the qualified housing base 12 obtained in Step 1-7 with the barrel-shaped motor housing 10, 3-2: Subject the assembly obtained from Step 3-1 to press riveting or welding.

To ensure the product quality meets the use requirements, a further preferred embodiment is also characterized in that the said S4 is intended for final inspection of the housing 10 press riveted or welded according to Step 3-2.

Oxalic acid is a metabolite of living bodies, which is widely distributed in plants, animals and fungi, and plays different roles in different living bodies. Researchers have discovered that oxalic acid is rich in hundreds of varieties of plants, in particular, spinach, three-colored amaranth, sugarbeet, pursalne, taro, sweet potato and rhubarb and other plants have the highest content of oxalic acid. Since oxalic acid can reduce the bioavailabilities of mineral elements and can easily form calcium oxalate with calcium ions and cause kidney stone in human body, oxalic acid is usually deemed as an antagonist for mineral element absorption and utilization.

| Chinese name | 草酸 | English name | Oxalic acid; Ethanedioic acid |
|---|---|---|---|
| Nickname | Oxalic acid | | |
| Molecular WT | 90.04 | Chemical formula | H2C2O4 |
| Density | 1.653 g/mL | Melting point | 101~102° C. |
| Safety | Low toxicity | Appearance | Colorless flake shape nomoclinic |
| Description | | Structure skeleton symbol | HOOCCOOH |
| Regulation info | This product is not subject to regulation | Acidity | Weak acidity |

The above descriptions are only preferred embodiments of the present invention, and it should be pointed out that it is apparent to those skilled in the art that a number of improvements and variations can also be made without departing from the technical principles of the present invention, and those improvements and variations shall also be deemed within the scope of the present invention.

The invention claimed is:

1. A machining process for manufacturing titanium motor housing product, wherein the said machining process includes the following steps:
    S1: using stamping equipment to stamp a base of the titanium motor housing product, wherein lubricant is applied on a surface of a die of the stamping equipment before stamping and a lubricating film is attached on a surface of metal titanium base material to be stamped;
    S2: using stamping equipment to stamp a barrel-shaped titanium motor housing, wherein lubricant is applied on a surface of a die of the stamping equipment for the barrel-shaped titanium motor housing before stamping and a lubricating film is attached on a surface of metal titanium base material to be stamped, wherein after stamping, the barrel-shaped housing with a barrel depth to port diameter ratio of 1.2 to 1.8:1 is obtained;
    S3: spraying and cleansing the housing base obtained from stamping in S1 and the barrel-shaped motor housing obtained from stamping in S2;
    S4: assembling the housing base and the barrel-shaped housing obtained in S3 to form the motor housing product;
    S5: inspecting the assembled motor housing product obtained in S4.

2. A machining process for manufacturing titanium motor housing product as described in claim 1, wherein the lubricant in the said S1 and S2 is cutting oil and calcium hydroxide (Ca(OH)$_2$) mixed into the cutting oil, and the lubricating film is oxalic acid.

3. A machining process for manufacturing titanium motor housing product as described in claim 2, wherein the lubricant applying method in the said S1 and S2 is using a spray gun or brush to apply the lubricant evenly on the surfaces of contact between a mould and a workpiece to be stamped, a lubricant coating thickness is 20 to 40 μm, and the method for attaching a lubricating film on the surface of the titanium base material in the said S1 and S2 is that it is attached to the surface of titanium base material by spraying or brush applying, wherein a thickness of the lubricating film on the surface of titanium base material is 15-30 μm.

4. A machining process for manufacturing the titanium motor housing product as described in claim 3, wherein the processing in the said S1 and S2 includes the following process steps:
    1-1: filming comprising attaching the lubricating film on the surface of the titanium base material to be stamped;

1-2: blanking comprising cutting the titanium base material with the surface lubricating film into the titanium base material to be stamped according to precalculated dimensions;

1-3: cleansing the stamped titanium base material obtained from Step 1-2 to remove grease dirt from the surface, preventing it from contaminating a vacuum annealing furnace;

1-4: Subjecting the barrel-shaped motor housing to tempering heat treatment for stress relief;

1-5: Repeat Steps 1-2 to 1-4, until a contour of the housing base meets production requirements;

1-6: punching side holes and base holes in the barrel-shaped motor housing;

1-7: subjecting the interior and exterior of the housing base or barrel-shaped motor housing resulting from steps 1-6 to polishing;

1-8: trimming the polished housing base or barrel-shaped motor housing, making its outline dimensions, appearance and form meet production requirements.

5. A machining process for manufacturing the titanium motor housing product as described in claim 4, wherein the tempering heat treatment in the said Step 1-4 is specifically as follows: first, subjecting the housing base or barrel-shaped motor housing to vacuum annealing at a temperature of 690° C.; then holding the temperature for 2 hours; after temperature holding, naturally cooling the housing base or barrel-shaped motor housing to a normal temperature in the vacuum furnace.

6. A machining process for manufacturing the titanium motor housing product as described in claim 4, wherein the housing in the said S3 is specifically done according to the following steps:

3-1: assembling the housing base obtained in Step 1-7 with the barrel-shaped motor housing, 3-2: subjecting the assembly obtained from Step 3-1 to press riveting or welding.

7. A machining process for manufacturing the titanium motor housing product as described in claim 6, wherein the said S4 is intended for final inspection of the housing press riveted or welded according to Step 3-2.

* * * * *